US009809161B1

United States Patent
Salter et al.

(10) Patent No.: US 9,809,161 B1
(45) Date of Patent: Nov. 7, 2017

(54) ILLUMINATED CUP HOLDER

(71) Applicant: Ford Global Technologies, LLC, Dearborn, MI (US)

(72) Inventors: Stuart C. Salter, White Lake, MI (US); Christopher Anthony Danowski, Rochester, MI (US); Paul Kenneth Dellock, Northville, MI (US); Pietro Buttolo, Dearborn Heights, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/278,216

(22) Filed: Sep. 28, 2016

(51) Int. Cl.
*B60Q 1/00* (2006.01)
*B60Q 1/26* (2006.01)
*B60Q 3/02* (2006.01)
*B60N 3/10* (2006.01)
*G02B 5/32* (2006.01)
*G02B 5/18* (2006.01)
*G03H 1/00* (2006.01)

(52) U.S. Cl.
CPC .......... *B60Q 3/0243* (2013.01); *B60N 3/101* (2013.01); *G02B 5/18* (2013.01); *G02B 5/32* (2013.01); *G03H 1/0005* (2013.01); *G03H 2001/0055* (2013.01); *G03H 2223/23* (2013.01)

(58) Field of Classification Search
CPC . B60N 3/10; B60N 3/101; B60Q 3/20; B60Q 3/60; B60Q 3/68; G02B 5/18; G02B 5/32; G03H 1/0005
USPC .......................................... 362/488, 509–510
See application file for complete search history.

(56) References Cited

U.S. PATENT DOCUMENTS

| | | | |
|---|---|---|---|
| 6,168,302 B1 | 1/2001 | Hulse | |
| 6,193,399 B1 | 2/2001 | Hulse | |
| 2006/0016109 A1 | 1/2006 | Nicolaas | |
| 2006/0274540 A1 | 12/2006 | Klaver et al. | |

*Primary Examiner* — Jason Moon Han
(74) *Attorney, Agent, or Firm* — Vichit Chea; Price Heneveld LLP

(57) ABSTRACT

A vehicle cup holder includes a console substrate defining a cup well. A light source is positioned to emit light into the cup well. An insert is positioned within the cup well and defines a base wall and a side wall. At least one of the base wall and the side wall defines a diffraction grating. A holographic film is positioned between the insert and the console substrate.

20 Claims, 7 Drawing Sheets

US 9,809,161 B1

ILLUMINATED CUP HOLDER

FIELD OF THE INVENTION

The present disclosure generally relates to cup holders, and more particularly, to vehicles having illuminated cup holders.

BACKGROUND OF THE INVENTION

Illumination systems used in vehicles may offer a unique and attractive viewing experience. It therefore may be desirable to incorporate such illumination systems in portions of vehicles to provide accent and functional lighting.

SUMMARY OF THE INVENTION

According to one aspect of the present invention, a vehicle cup holder includes a console substrate defining a cup well. A light source is positioned to emit light into the cup well. An insert is positioned within the cup well and defines a base wall and a side wall. At least one of the base wall and the side wall defines a diffraction grating. A holographic film is positioned between the insert and the console substrate.

According to another aspect of the present invention, a vehicle cup holder includes a console substrate defining a cup well. A light source is positioned to emit light into the cup well. An insert is positioned within the cup well and defines a base wall and a side wall. At least one of the base wall and the side wall defines a diffraction grating. A holographic film is positioned between the insert and the console substrate.

According to another aspect of the present invention, a vehicle cup holder includes a console substrate defining a cup well. An insert is positioned within the cup well and defines a base wall and a side wall. At least one of the base wall and the side wall defines a holographic grating and is positioned with the cup well.

According to yet another aspect of the present invention, a vehicle cup holder includes a console substrate defining a cup well. An insert is positioned within the cup well and defines a base wall and a side wall, wherein the base wall defines at least one of a holographic grating and a diffraction grating.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
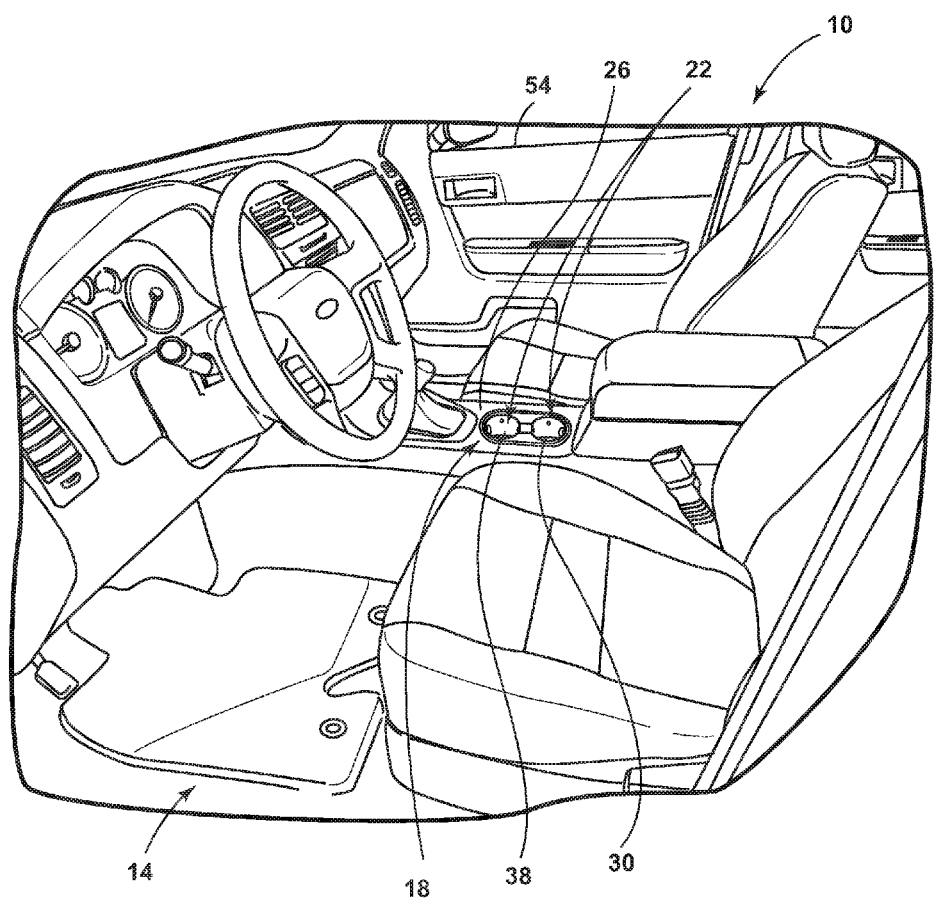
FIG. 1 is a perspective view of an interior of a vehicle having holographic cup holders, according to one embodiment.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1-7, reference 10 generally designates a vehicle having an interior 14 within which a console 18 is positioned. The console 18 includes one or more cup holders 22. The cup holders 22 include a console substrate 26 and a cup well 30 defined by the console substrate 26. One or more light sources 34 are positioned approximate the cup holder 22 and configured to emit light into the cup well 30. An insert 38 is positioned within the cup well 30 and defines both a base wall 38A and sidewall 38B. According to various embodiments, at least one of the base wall 38A and the sidewall 38B of the insert 38 defines a diffraction grading 42. In some embodiments, a holographic film 46 is positioned between the insert 38 and the console substrate 26. Additionally or alternatively, the insert 38 may define one or more holographic gratings 50.

Referring now to FIG. 1, as explained above, the interior 14 of the vehicle 10 includes one or more cup holders 22. In the depicted embodiment, the cup holders 22 are positioned in a center console embodiment of the console 18 of the vehicle 10, but it would be understood that the cup holders 22 may be positioned in a variety of locations within the vehicle 10. For example, the cup holders 22 may be positioned on a door 54 of the vehicle 10 proximate a door handle of proximate a foot well. Additionally or alternatively, the cup holders 22 may be positioned proximate a rear seat of the vehicle 10 in a rear center console (e.g., foldable), rear doors, seat backs or other areas in a rear of the vehicle 10. Although depicted as including two cup holders 22, it would be understood that a single cup holder 22 or more than two cup holders 22 may be utilized with the vehicle 10.

Figure 2:
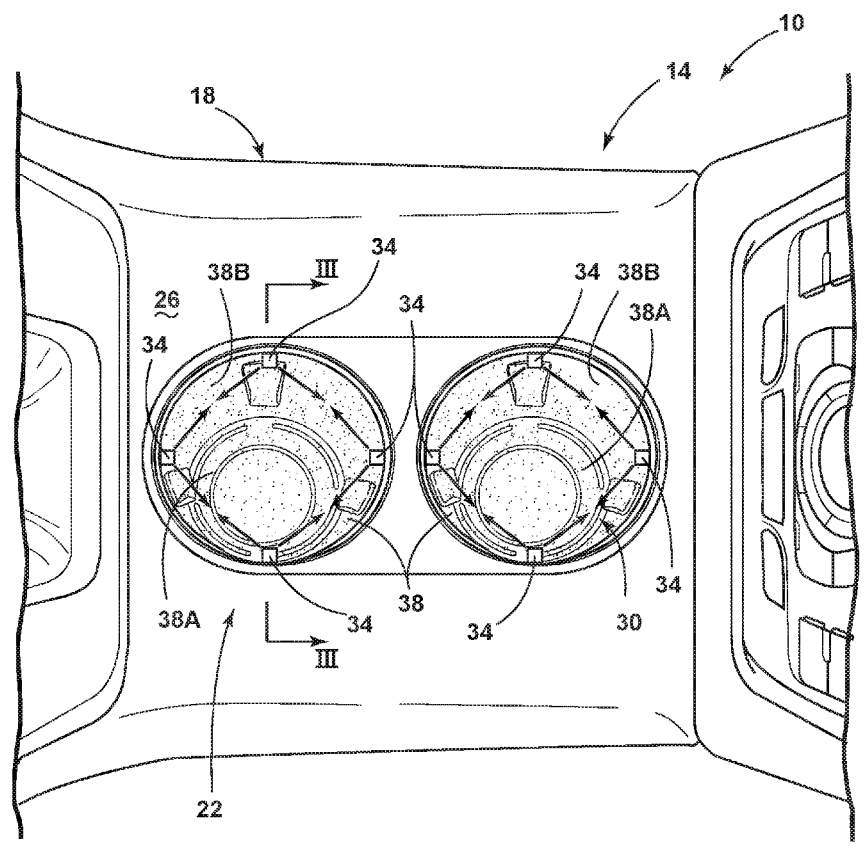
FIG. 2 is a top plan view of a cup holder of the vehicle, according to one embodiment.
Figure 3:
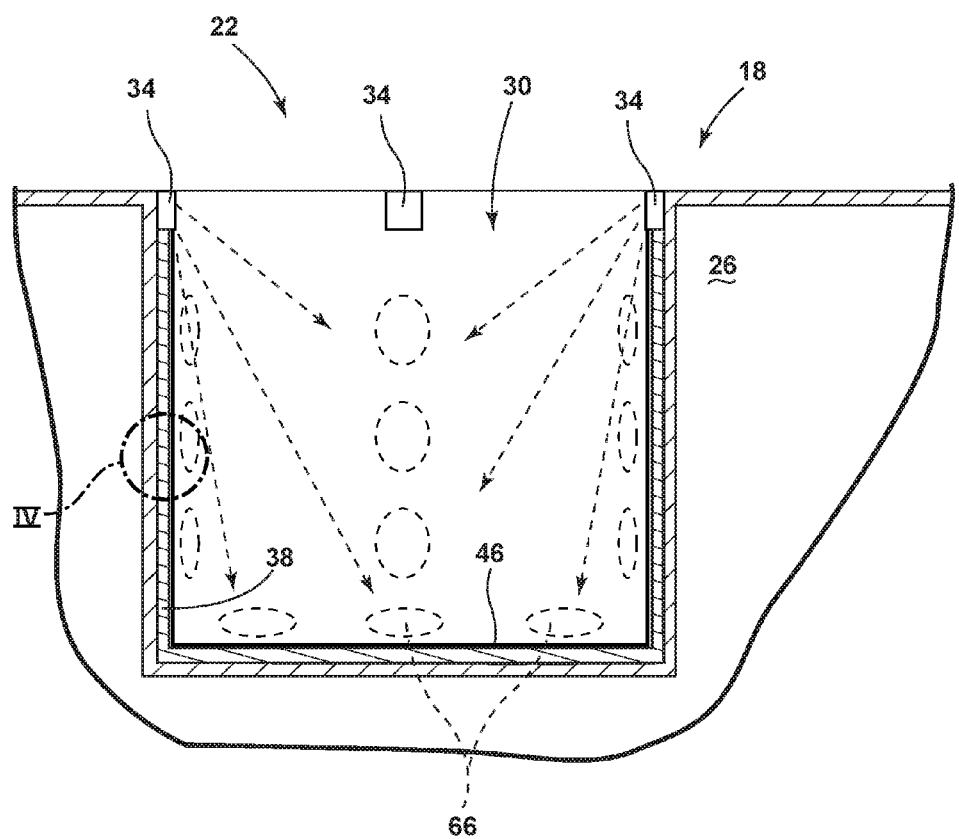
FIG. 3 is a cross-sectional view taken at line III of FIG. 2, according to one embodiment.
Figure 4:
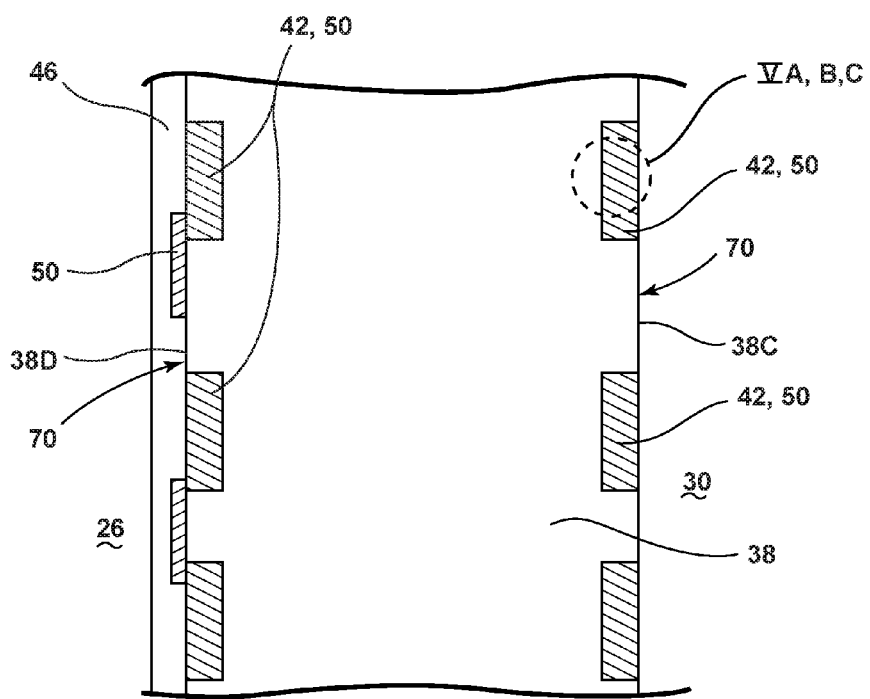
FIG. 4 is an enhanced view taken at section IV of FIG. 3, according to one embodiment.

Referring now to FIGS. 2-4, as explained above, the light sources 34 are configured to emit light into the cup well 30. In the depicted embodiment, light sources 34 are positioned within the cup well 30 above the insert 38. In the depicted embodiment, the light sources 34 are positioned proximate a lip of the cup well 30. It will be understood that in alternative embodiments the light sources 34 may be positioned behind the insert 38 or that the insert 38 may define windows to allow light from the light sources 34 into the cup well 30. Each cup holder 22 may include a single light source 34, or a plurality of light sources 34. For example, in the depicted embodiment, there are four light sources 34 positioned in a spaced apart configuration around the cup well 30. Alternatively, in an embodiment utilizing multiple light sources 34, the light sources 34 may be positioned close to one another or in another pattern around the cup holder. It will be understood that the light sources 34 of one cup holder 22 may illuminate more than one cup holder 22. The light sources 34 may be capable of emitting white, colored, nonvisible (e.g., ultraviolet and/or infrared), coherent and/or incoherent light into and around the cup well 30. As it will be explained in greater detail below, each of the light sources 34 may be independently activated such that a variety of light patterns may be achieved. Further, each of the light sources 34 may emit a different type of light or have a different activation pattern. Although depicted as substantially emitting lights into the cup well 30, it will be understood that the light sources 34 may illuminate portions of the console 18 and console substrate 26 outside of the cup well 30 without departing from the teachings provided herein. The light sources 34 may include incandescent bulbs, light-emitting diodes, electroluminescent elements, as well as other sources of light. The light sources 34 may have a 120° beam pattern. According to some embodiments, the light sources 34 may be positioned away from the cup holders 22, or in a different location than depicted, and may be optically coupled with one or more waveguides or light pipes. Such waveguides or light pipes may transmit light to the cup well 30 from the light sources 34.

Positioned within the cup well 30 of the console substrate 26, is the optional holographic film 46 and the insert 38. The holographic film 46 may define one or more holographic gratings 50. The holographic film 46 may be a polymeric film having a plurality of features configured to form an interference pattern (e.g., the diffraction grating 50). The features of the holographic film 46 may be ridges, variations in opacity, density or surface profile. The holographic film 46 may be composed of polyethylene terephthalate, orientated polypropylene and/or polyvinyl chloride materials. The holographic film 46 may be metalized or transparent. The holographic film 46 may have a density of between about 70 gsm and about 450 gsm. Light from the light sources 34 falling on the interference pattern diffracts into a light field which forms a projected image 66. The projected image 66 may also be known as a hologram. The light field which forms the projected image 66 may exhibit visual depth queues such as parallax and perspective that change realistically with any change in the relative position of the observer (e.g., an occupant within the interior 14 of the vehicle 10). As the projected image 66 exhibits a depth and changes with changing perspective of the observer, the projected image 66 is a hologram. Use of embodiments of the cup holders 22 which incorporate multiple light sources 34 may be advantageous in providing a uniform appearance to the projected images 66 regardless of viewing perspective (e.g., driver seat vs. passenger seat) of the observer. In other words, a skewing of the projected image 66 based on the lighting may not occur, or be apparent to the viewer. Further, use of multiple light sources 34 may allow for the projected image 66 to change in intensity and/or color and may also simulate movement of the projected image 66 as described in greater detail below.

The projected image 66 may take a variety of configurations including alpha numeric text, symbols (e.g., a cup holder symbol, vehicle make or model symbols, star pattern, etc.), as well as pictures. The projected image 66 may change color with a change in the color of the light sources 34. Further, the projected image 66 may appear different from different angles and embodiments utilizing differently oriented or differently colored light sources 34. For example, the intensity or color of the projected image 42 may vary based on the observer's seat position within the interior 14 of the vehicle 10. The intensity of the projected image 66 may be increased or decreased by a corresponding increase or decrease in light from one or more of the light sources 34. According to various embodiments, altering the activation of the light sources 34 may be configured to give the projected image 66 the appearance of movement. For example, by activating the light sources 34 in an alternating manner, the projected image 66 may be skewed in an alternating manner giving the appearance of movement. Further, a different projected image 66 may be formed by the activation of each light source 34 such that the projected image 66 appears to be moving around the cup holder 22. It will be understood that more than one holographic film 46 may be utilized and that a light source for each holographic film 46 may be present. In such an embodiment, the projected image 42 may change based on which light source is activated. Based on the lighting from the light sources 34, the projected image 66 may provide a 120° cone of image stand off from the console substrate 26 and/or the holographic film 46. Use of the holographic film 46 below the insert 38 may allow the projected image 66 to be formed within the insert 38 and/or within the cup well 30.

In the depicted embodiment, the insert 38 is positioned over the holographic film 46 within the cup well 30. It will be understood that embodiments where the holographic film 46 is not utilized, the insert 38 may be in direct contact with the console substrate 26. The insert 38 defines the base wall 38A and sidewall 38B. Further, the insert 38 defines an interior surface 38C and an exterior surface 38D. Both the interior and exteriors surfaces 38C, 38D of the base wall 38A and the side wall 38B may define the diffraction and holographic gratings 42, 50. The exterior surface 38D is positioned to contact the holographic film 46 and/or the console substrate 26, and the interior surface 38C is configured to contact objects within the cup holder 22 (e.g., drinks, change, accessories). The insert 38 may be composed of silicone, polyisoprene, polybutadiene, chloroprene, butyl rubber, nitrile rubber, fluorosilicate, fluoroelastomers, ethylene vinyl acetate, other soft polymeric materials and/or combinations thereof. In a specific example, the insert 38 may be molded and be formed of silicone. The insert 38 may be opaque, translucent, or substantially transparent. The insert 38 may have a transparency to light in a visible spectrum (e.g., about 400 nm to about 700 nm) of greater than about 50%, 60%, 70%, 80%, 90% or 99%. In some examples, the insert 38 may include a colorant (e.g., to color or filter the light passing through or being reflected off of the insert 38), an ultra violet inhibitor or blocker (e.g., a hindered amine or benzoyl). As explained in greater detail below, the interior surface 38C and/or the exterior surface 38D of the insert 38 may define one or more diffraction gratings 42 and/or holographic gratings 50. In embodiments where the insert 38 defines holographic gratings 50, the holographic gratings 50 of the insert 38 may be substantially similar to the holographic gratings 50 of the holographic film 46.

Figure 5A:
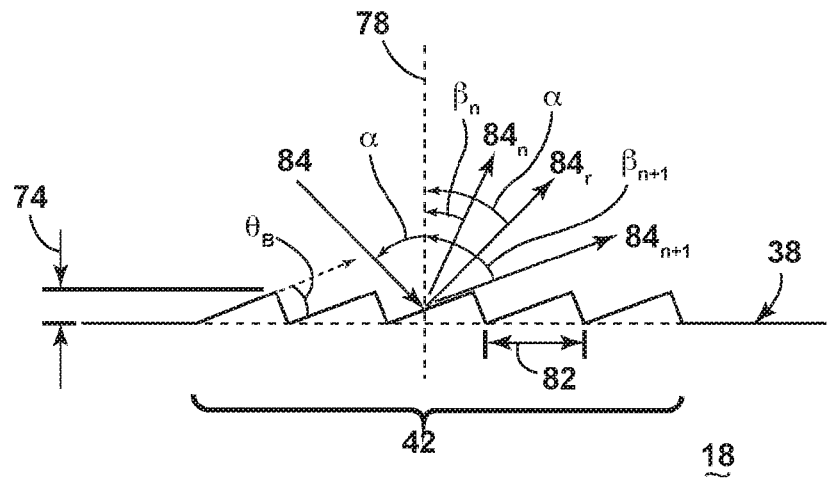
FIG. 5A is an enhanced view taken at section VA of FIG. 4, according to one embodiment.
Figure 5B:
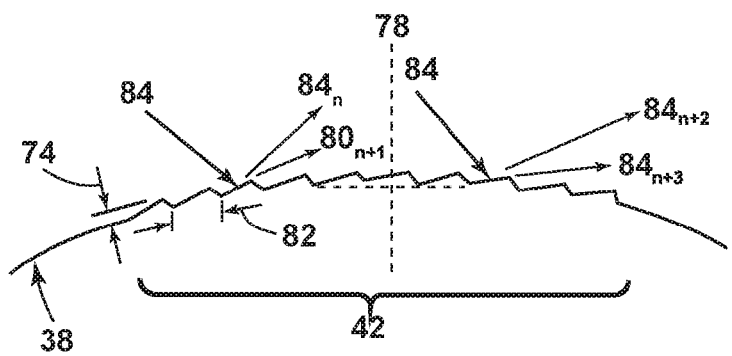
FIG. 5B is an enhanced view taken at section VB of FIG. 4, according to one embodiment.
Figure 5C:
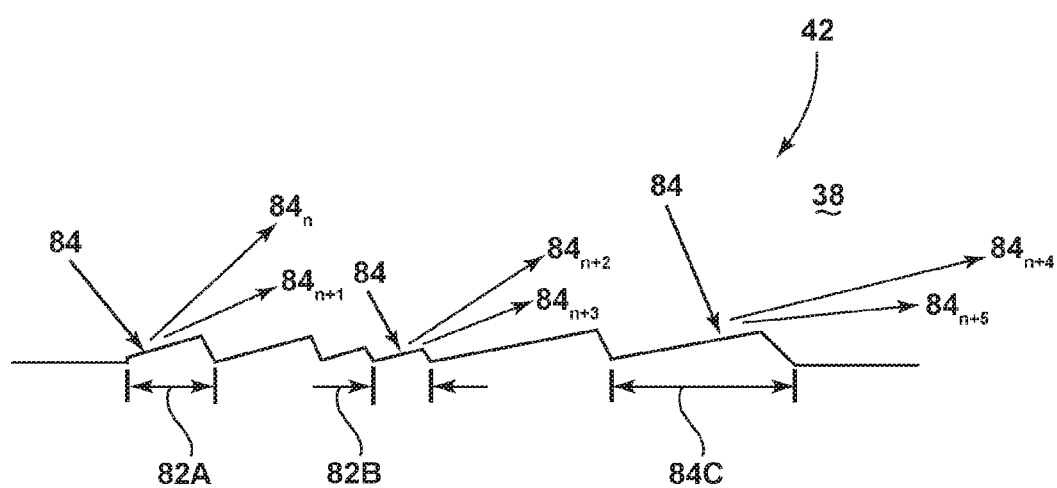
FIG. 5C is an enhanced view taken at section VC of FIG. 4, according to one embodiment.

Referring now to FIGS. 4-5C, the interior surface 38C of the insert 38 may have a generally curved shape, as depicted, or may have a flat, square, rectangular, polygonal, undulating, or other complex shape. For example, one or more locations of the interior surface 38C of the insert 38 may be faceted, non-planar, curved or characterized by other shapes. Further, the interior and exterior surfaces 38C, 38D can be characterized with portions having planar features and portions having non-planar features. As shown in FIG. 4, for example, the insert 38 has a flat interior and exterior surfaces 38C, 38D defining the diffraction and holographic gratings 42, 50 as viewed in the cross section. The insert 38 may define a plurality of spaces 70 between the diffraction and holographic gratings 42, 50 on the interior and exterior surfaces 38C, 38D which remain substantially transparent to ambient light and/or the light from the light sources 34. The spaces 70 allow ambient light to penetrate the insert 38 to contact the diffraction and holographic gratings 42, 50 positioned on the exterior surface 38D and/or holographic film 46. Further, the spaces 70 allow light which contacted the diffraction and/or holographic gratings 42, 50 to be emitted from the insert 38. Further, each of the plurality of diffraction gratings 42 may have a different period, range of periods, and/or shape, such that the iridescence of the insert 38 appears random and more jewel like. The spaces 70 and the diffraction gratings 42 may be strategically positioned along the interior and exterior surfaces 38C, 38D to cooperate with the shape of the interior and exterior surfaces 38C, 38D to create a more jewel-like appearance. Use of the holographic gratings 50 may enhance to jewel-like appearance of insert 38.

Referring now to FIGS. 5A and 5B, the diffraction grating 42 is configured to produce an iridescent pattern to light impinging upon it. The diffraction grating 42 may be present on a flat embodiment of the insert 38 (FIG. 5A) on a curved embodiment of the insert 38 (FIG. 5B), or on other shapes of the interior or exterior surfaces 38C, 38D of the insert 38. For example, the diffraction grating 42 may be configured to reflect light of different wavelengths in different directions. The diffraction grating 42 may have a thickness 74 that ranges from about 250 nm to about 1000 nm. The thickness 74 of the diffraction grating 42, for example, should be maintained in the range of about 250 nm to about 1000 nm according to one embodiment to ensure that the insert 38 exhibits a jewel-like appearance through light diffraction upon illumination in direct ambient lighting while also having a minimal effect on the optical clarity of the insert 38 under non-direct ambient lighting. Preferably, the thickness 74 of the diffraction grating 42 ranges from about 390 nm to 700 nm. In other embodiments, the thickness 74 of the diffraction gratings 42 ranges from 500 nm to 750 nm. As depicted in FIG. 5A in exemplary form, the diffraction grating 42 may have a sawtooth or triangular shape. In three dimensions, these gratings 42 can appear with a stepped or sawtooth shape without angular features, pyramidal in shape, or some combination of stepped and pyramidal shapes. Other shapes of the diffraction grating 42 include hill-shaped features (e.g., sinusoidal or curved shaped features). The diffraction grating 42 can also include portions with a combination of triangular and hill-shaped features. More generally, the shapes of the grating 42 should be such that an effective blazing angle $\theta_B$ of at least 15 degrees is present for one or more portions of each grating, tooth or groove of the diffraction grating 42. The blaze angle $\theta_B$ is the angle between step normal (i.e., the direction normal to each step or tooth of the grating 42) and a direction normal 78 to the interior and/or exterior surfaces 38C, 38D having the diffraction grating 42.

Generally, the blaze angle $\theta_B$ is optimized to maximize the efficiency of the wavelength(s) of the incident light which may be typical ambient sunlight, light from the light sources 34, to ensure that maximum optical power is concentrated in one or more diffraction orders while minimizing residual power in other orders (e.g., the zeroth order indicative of the ambient light itself). An advantage of situating the diffraction gratings 42 on planar portions or aspects of the interior and exterior surfaces 38C, 38D of the insert 38 is that a constant blaze angle $\theta_B$ and a period 82 will result in consistent reflected and diffracted light produced from the diffraction grating 42.

The diffraction grating 42 of the insert 38 may be characterized by one or more periods 82 (also known as d in the standard nomenclature of diffraction gratings). In most aspects of the insert 38, the period 82 of the diffraction grating 42 is maintained between about 50 nm and about 5 microns. In general, the maximum wavelength that a given diffraction grating 42 can diffract is equal to about twice the period 82. Hence, a diffraction grating 42 with the period 82 that is maintained between about 50 nm and about 5 microns can diffract light in an optical range of 100 nm to about 10 microns. In a preferred embodiment, the period 82 of the diffraction grating 42 is maintained from about 150 nm to about 400 nm, ensuring that the diffraction grating 42 can efficiently diffract light in an optical range of about 300 nm to about 800 nm, roughly covering the visible spectrum.

Incident light 84 (typically ambient, sun light and the phosphorescent light) at an incident angle $\alpha$ is directed against a sawtooth-shaped diffraction grating 42 having a thickness 74, a period 82 and a blaze angle $\theta_B$. More particularly, a portion of the incident light 84 (preferably, a small portion) striking the diffraction grating 42 at an incident angle $\alpha$ is reflected as reflected light 84r at the same angle $\alpha$, and the remaining portion of the incident light 84 is diffracted at particular wavelengths corresponding to diffracted light 84n, 84n+1, etc., at corresponding diffraction angles $\beta n$, $\beta n+1$, etc. The reflected light 84r is indicative of the zeroth order (i.e., n=0) and the diffracted light $84_n$, $84_{n+1}$, $84_{n+2}$ are indicative of the nth order diffraction according to standard diffraction grating terminology, where n is an integer corresponding to particular wavelengths of the reflected or diffracted light.

Referring now to FIG. 5C, an example of the diffraction grating 42 employing varying periods (e.g., as including a set of periods) that can be employed in iridescent inserts 38 depicted in a cross-sectional form, according to an aspect of the disclosure. In the depicted example, the diffraction grating 42 can have two or more sets of teeth or grooves, each having a particular period 82 that can produce light at unique or differing diffraction orders. As shown, the grating 42 is configured with three periods—period 82A, period 82B, and period 82C. One set of teeth of the diffraction grating 42 with a period of 82A can produce diffracted light 84n and $84_{n+1}$, a different set of teeth with a period of 82B can produce diffracted light $84_{n+2}$ and $84_{n+3}$, and a third set of teeth with a period of 82C can produce diffracted light $84_{n+4}$ and $84_{n+5}$, all from the same incident light 84. Consequently, the diffraction grating 42, whether employed on interior or exterior surfaces 38C, 38D (FIG. 4) of the insert 38, advantageously can produce jewel-like effects of widely varying wavelengths within various regions of the insert 38.

The diffraction and holographic gratings 42, 50 may be formed into the insert 38 in a variety of ways. For example, a chemical based laser may etch a mold, used for injection molding the insert 38, with the diffraction and holographic gratings 42, 50. The material of the insert 38 may flow into the etchings and thereby form the diffraction and holographic gratings 42, 50 on the insert 38.

In some aspects, the diffraction grating 42 includes a varying period that varies between two to ten discrete values or, more preferably, between two to five discrete values across the diffraction grating 42. According to another aspect, the diffraction grating 42 with varying periods can be employed in one or more portions of the interior and/or exterior surfaces 38C, 38D of the insert 38, and one or more diffraction gratings 42 having a constant period are employed in other portions of the interior and/or exterior surfaces 38C, 38D of the insert 38 to create interesting, jewel-like appearance effects produced by the insert 38 employing the gratings 42. In another example, the diffraction grating 42 includes a varying period that changes between any number of values, only limited by the overall length of the grating 42 and/or the processing capabilities to develop such variability through precise control of mold dimensions. In another embodiment there may be a plurality of diffractions gratings 42 in a spaced apart configuration across the interior and/or exterior surfaces 38C, 38D of the insert 38. In such an embodiment, the plurality of diffraction gratings 42 may have the same or a different period. In yet another embodiment, the diffraction grating(s) 42 may substantially cover the interior and/or exterior surfaces 38C, 38D of the insert 38. In examples where diffraction gratings 42 are present on the exterior surface 38B, the diffraction taking place on the exterior surface 38B may provide an aesthetically pleasing "depth" to the insert 38.

In some examples, optional coatings may be applied over the interior surface 38C of the insert 38. For example, an optically clear sealing layer (e.g., a polyurethane seal) can be applied over the interior surface 38C to add further mechanical and/or ultraviolet light protection to the insert 38, particularly to any diffraction gratings 42 defined by the interior surface 38C. Advantageously, the addition of a relatively thin protective coating can protect the diffraction gratings 42 while retaining the benefits of locating the grating on the interior surface 38C of the insert 38 in terms of diffraction efficiency and the overall iridescence obtained by the insert 38.

Figure 6:
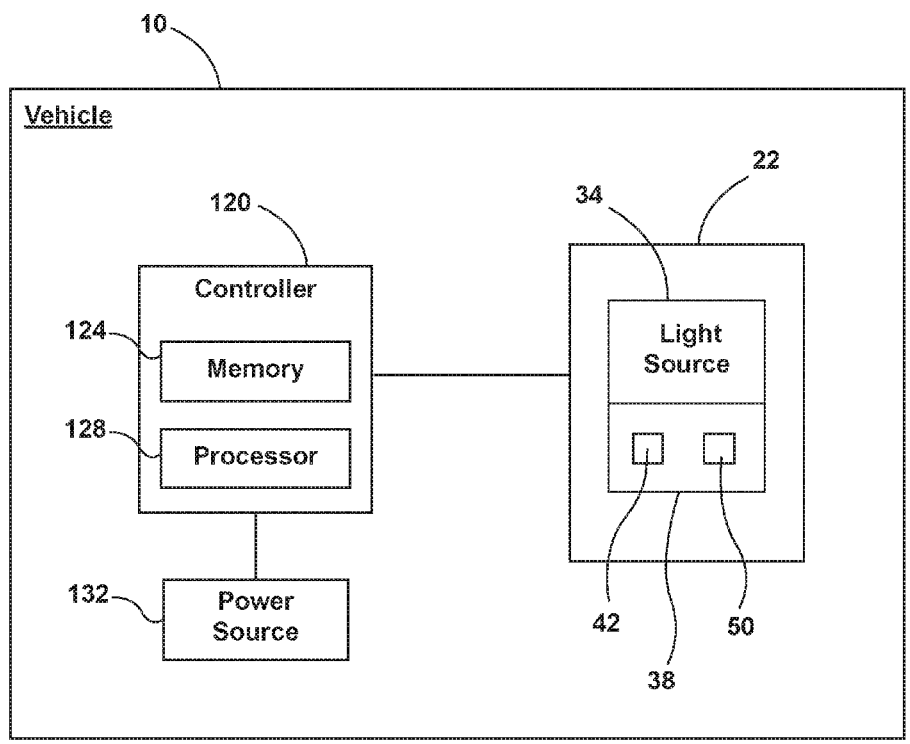
FIG. 6 is a block diagram of the vehicle, according to one embodiment.

Referring now to FIG. 6, a block diagram of vehicle 10 is shown in which the cup holder 22 is implemented. The vehicle 10 includes a controller 120 in communication with the light sources 34. The controller 120 may include a memory 124 having instructions contained therein executed by a processor 128 of the controller 120. The controller 120 may provide electrical power to the light sources 34 by a power source 132 located onboard the vehicle 10. The memory 124 may include a variety of routines configured to vary the color and intensity emitted by the light sources 34 that may be executed by the controller 120. For example, the light sources 34 may increase in brightness and/or change color to correspond with various vehicle events (e.g., welcome or farewell events, vehicle start, moving, stationary). In specific examples, the intensity of the light sources 34 may be altered relative to one another in order to make the projected image 66 appear to move or change color as explained above. Further, the intensity and/or color of the light sources 34 may be altered based on a user defined preference for ambient lighting in the interior 14 of the vehicle 10. In another example, the intensity of each of the light sources 34 may be set in a random order, and pulsed for a random amount of time to create a random sparkling appearance in the insert 38. Light sources 34 producing the projected images 66 may also be activated.

Use of the present disclosure may offer a variety of advantages. First, use of the holographic film 46 and/or the holographic gratings 50 and the light sources 34 may provide a projected image 66 which appears to be floating within the insert 38 and/or within the cup well 30. Such a feature may enhance the aesthetic appearance of the cup holders 22. Second, use of multiple light sources 34 allows for the projected image 66 to change in appearance through changing intensity, color and/or movement. Third, use of the diffraction gratings 42 may create a pleasing crystal-like effect. For example, in clear embodiments of the insert 38 where the diffraction gratings 42 are defined on the exterior surface 38D of the insert 38, the diffraction of light by the clear insert 38 may produce a "crystal" like appearance. In examples, where the insert 38 is colored (e.g., black) and the diffraction gratings 42 are defined on the interior surface 38A, a "black quartz" effect may be achieved.

It will be understood that the diffraction gratings 42 and the holographic grating 50 may be defined or positioned on the console substrate 26.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other materials, exemplary embodiments of the disclosure disclosed herein may be formed from a wide variety of unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovation have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle cup holder, comprising:
   a console substrate defining a cup well;
   a light source positioned to emit light into the cup well;
   an insert positioned within the cup well and defining a base wall and a side wall, wherein at least one of the base wall and the side wall defines a diffraction grating; and
   a holographic film positioned between the insert and the console substrate.

2. The vehicle cup holder of claim 1, wherein the holographic film is positioned between the base wall and the console substrate.

3. The vehicle cup holder of claim 1, wherein the holographic film is positioned between the side wall and the console substrate.

4. The vehicle cup holder of claim 1, wherein the diffraction grating is defined on an interior surface of the insert.

5. The vehicle cup holder of claim 1, wherein the diffraction grating is defined on an exterior surface of the insert.

6. The vehicle cup holder of claim 1, further comprising:
   a plurality of light sources configured to emit light into the insert.

7. The vehicle cup holder of claim 6, wherein the plurality of light sources are in a spaced apart configuration around the cup well.

8. The vehicle cup holder of claim 7, wherein the plurality of light sources are positioned above the insert.

9. The vehicle cup holder of claim 1, wherein the insert is substantially transparent.

10. A vehicle cup holder, comprising:
    a console substrate defining a cup well;
    a plurality of light sources positioned to emit light into the cup well; and
    an insert positioned within the cup well and defining a base wall and a side wall, wherein at least one of the base wall and the side wall defines a holographic grating.

11. The vehicle cup holder of claim 10, wherein the insert defines multiple diffraction gratings.

12. The vehicle cup holder of claim 11, wherein the diffraction gratings are defined on an interior surface of the insert.

13. The vehicle cup holder of claim 10, wherein the holographic grating is defined on the side wall.

14. The vehicle cup holder of claim 10, wherein the holographic grating is defined on the base wall.

15. The vehicle cup holder of claim 10, wherein the plurality of light sources are positioned above the insert.

16. A vehicle cup holder, comprising:
    a console substrate defining a cup well; and
    an insert positioned within the cup well and defining a base wall and a side wall, wherein the insert defines at least one holographic grating positioned within the cup well.

17. The vehicle cup holder of claim 16, wherein the base wall defines the holographic grating.

18. The vehicle cup holder of claim 16, wherein the base wall defines a diffraction grating.

19. The vehicle cup holder of claim 17, further comprising:
    a plurality of light sources positioned on the console substrate above the insert and configured to emit light into the insert.

20. The vehicle cup holder of claim 19, wherein the insert is substantially transparent.

* * * * *